United States Patent [19]

Vohr

[11] 4,381,128

[45] Apr. 26, 1983

[54] VIBRATION DAMPING TILTING PAD JOURNAL BEARING

[75] Inventor: John H. Vohr, Schenectady, N.Y.

[73] Assignee: General Electric Company, Schenectady, N.Y.

[21] Appl. No.: 236,008

[22] Filed: Feb. 19, 1981

[51] Int. Cl.³ .......................................... F16C 17/03
[52] U.S. Cl. .................................. 384/154; 384/192; 384/99
[58] Field of Search ............................ 308/73, 9, 122

[56] References Cited

U.S. PATENT DOCUMENTS

| Re. 25,028 | 8/1961 | Thompson | 308/73 |
|---|---|---|---|
| 2,538,746 | 1/1951 | Dall | 308/73 |
| 3,004,804 | 10/1961 | Pinkus et al. | 308/73 |
| 3,015,523 | 1/1962 | Semar | 308/9 |
| 3,497,276 | 2/1970 | McGrew, Jr. et al. | 308/73 |
| 3,807,814 | 4/1974 | Stopp | 308/73 |
| 3,972,572 | 8/1976 | Hohn | 308/73 |
| 4,032,199 | 6/1977 | Jenness | 308/73 |
| 4,113,325 | 9/1978 | Miller | 308/9 |
| 4,291,926 | 9/1981 | Tomioka et al. | 308/73 |

FOREIGN PATENT DOCUMENTS 55-60716  5/1980  Japan .................................. 308/73

Primary Examiner—Stuart S. Levy
Assistant Examiner—Daniel P. Stodola
Attorney, Agent, or Firm—Robert C. Kain, Jr.; John F. Ahern

[57] ABSTRACT

A tilting pad journal bearing in which the bearing contributes to vibration damping of the supported rotating part without the necessity of substantially preloading the pads against the journal. In a preferred embodiment for a horizontally mounted shaft, the upper, lesser loaded pads are preloaded lightly against the journal by supplying lubricating oil at low pressure to a narrow interstitial space between each such preloaded pad and the bearing casing. In operation, the interstitial space acts as a flow restriction means to prevent a rapid outflow of oil, restricting the pad and shaft from sudden, vibratory movements.

3 Claims, 3 Drawing Figures

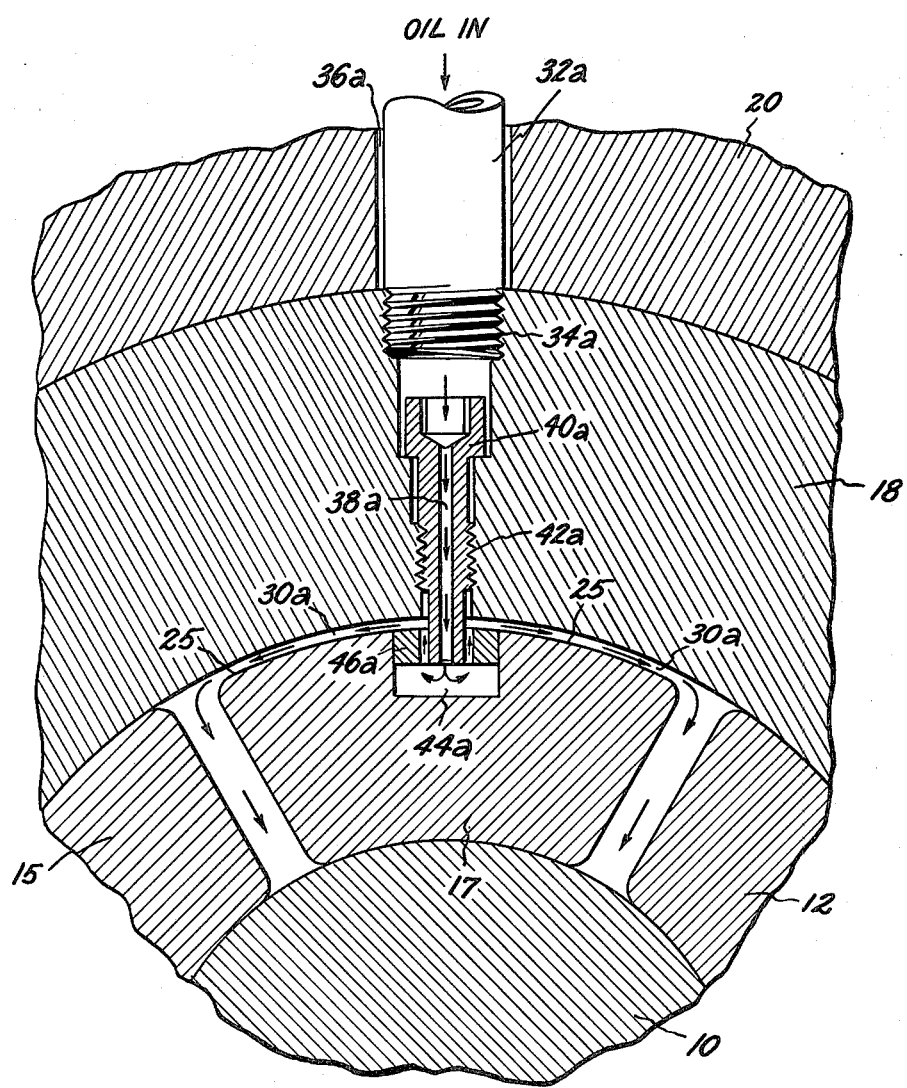

VIBRATION DAMPING TILTING PAD JOURNAL BEARING

BACKGROUND OF THE INVENTION

This invention pertains generally to the field of journal bearings and in particular to a tilting pad journal bearing in which the bearing contributes significantly to the overall damping of the supported rotating part without requiring substantial preloading of the pads against the journal.

Tilting pad bearings are commonly used in large high-speed rotating machinery such as gas and steam turbines and high-speed compressors. Although most applications of the tilting pad bearing are generally regarded as quite successful, it is recognized that, in some situations, the tilting pad bearing's capacity for vibration damping is less than desired. For example, tilting pad bearings used for a turbine rotor provide the only practical means by which vibrations in the rotor may be damped. It is apparent then that the damping characteristics of these bearings in that particular application are a very important consideration, and means for improving their damping capabilities have been eagerly sought by workers in the field.

One example of a tilting pad bearing presented as an improvement over more conventional designs - but not specifically directed to improved vibration damping - is that disclosed in U.S. Pat. No. 3,549,215 to Hollingsworth. In the bearing described in the '215 patent, each individual pad (typically, tilting pad bearings utilize 3-6 pads) is supported on a hydrodynamically generated oil film pressurized by high pressure oil bled from the lubricating film that exists between the journal and the pad. This arrangement is directed toward improving the support characteristic of the more heavily loaded pads by eliminating the mechanical pivot otherwise required for such pads and replacing this "hard" support with a more compliant one.

A high-speed bearing long known in the art as a predecessor to the tilting pad bearing, and designed principally for use in steam turbines and the like, is that disclosed in U.S. Pat. No. 2,584,770 to Wilcock. In the Wilcock bearing, a segment of the bearing is loaded by withdrawing oil from the lower, loaded segment for pressurizing the opposing, upper segment. The purpose of this particular bearing is to create a significant additional load on the journal to stabilize it against oil whip. It is notable that the Wilcock bearing is not a tilting pad type which, incidentally, are inherently stable against oil whip.

Thus, while the foregoing discussion is believed to present the status of the prior art in the field of high speed bearings having particular utility in large rotary machines, it has been recognized that tilting pad bearings having improved damping characteristics would be very desirable for use in such machines. Accordingly, it is an objective of the present invention to provide a tilting pad bearing in which the normal, "hard" support for loaded pads is retained while the damping characteristics are improved without significantly altering any of the other operating characteristics of the bearing.

SUMMARY OF THE INVENTION

In a preferred embodiment of the invention for a horizontally mounted shaft, the upper pads (being the lowest loaded of the plurality retained in the bearing casing) are preloaded lightly against the journal by supplying hydraulic fluid at low pressure to an interstitial space between the pad and the casing. Advantageously, the hydraulic fluid may be the oil supplied for ordinary bearing lurication. Hydraulic fluid pressure in the interstitial space lightly peloads the pad against the journal, while, in operation, the narrow interstitial space serves as a flow restriction means to prevent the rapid outflow of hydraulic fluid and thus to prevent rapid displacement of the pad against the fluid pressure. The pad therefore acts as a very hard pad against sudden movements of the journal and restrains it from vibrating while being very lightly loaded under normal conditions. In one aspect of the invention, the hydraulic fluid is supplied to the receiving means, or interstice, through an orifice in a stud provided as an anti-rotation pin at the outer side of the bearing pad.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

FIG. 2 is a transverse section of a portion of the bearing of FIG. 1 but drawn to a somewhat larger scale and provided with directional flow arrows for the hydraulic fluid delivered under low pressure to the hydraulically preloaded bearing pads.

DETAILED DESCRIPTION OF THE INVENTION

Figure 1:
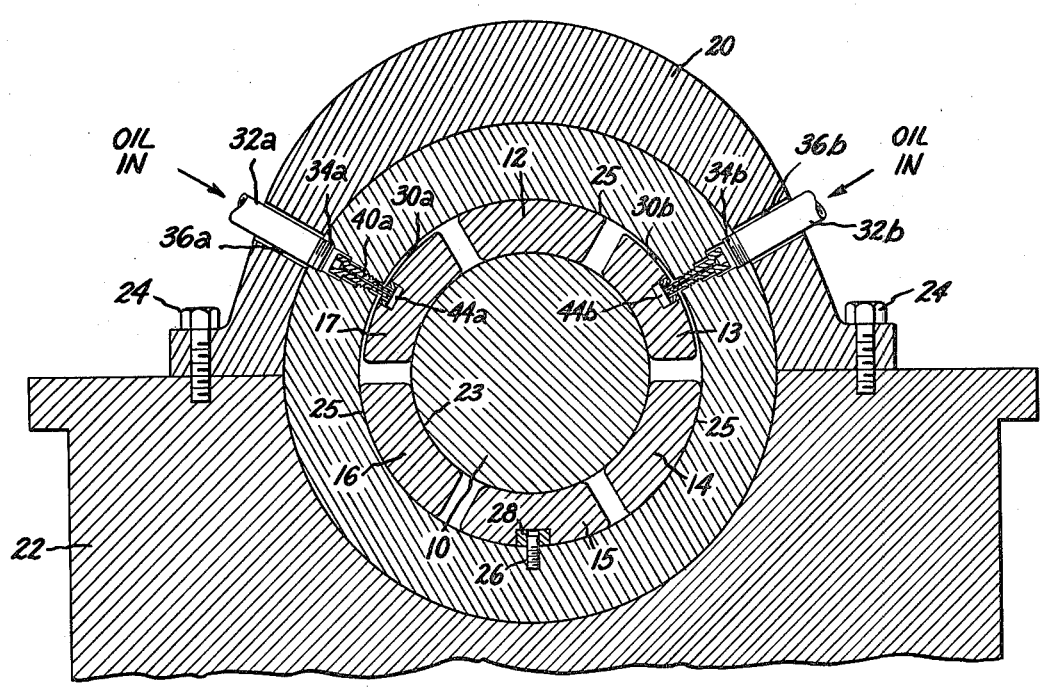
FIG. 1 is a transverse sectional view of a journal bearing incorporating the invention.

Referring to the preferred embodiment of FIG. 1, there is shown, in cross section, the journal portion 10 of a rotating shaft such as, for example, that of a steam turbine (not specifically shown). Concentric with the journal 10 are a plurality of segmented, tilting pads 12-17 retained within a casing 18 which is also concentric with the journal 10. Surrounding the casing 18 are top and bottom shell members 20 and 22, respectively, fastened together along a horizontal plane by conventional means such as by bolts 24. Each tilting pad 12-17 has an inner bearing surface 23 which is closely concentric to the cylindrical surface is journal 10 and an outer surface 25 which substantially conforms geometrically to casing 18. The pads 12-17 are held in place by journal 10 and casing 18, and are prevented from circumferential dislocation by anti-rotation pins such as pin 26 affixed to casing 18 and projecting loosely into a bushing 28 on the outer surface of pad 15. Anti-rotation pins for pads 12, 14, and 16 are not specifically illustrated, being substantially identical to that illustrated for pad 15. For pads 13 and 17, effective anti-rotation pinning is more fully discussed herein below. In operation, each pad 12-17 is free to respond to forces generated by shaft rotation and to position itself accordingly.

The lower pads 14, 15, and 16 are loaded by the weight of the shaft 10; on the other hand, the upper pads 12, 13, and 17 are in a lower loading position within casing 18 since they do not bear weight from shaft 10. However, pads 13 and 17 are preloaded by the introduction of lubricating oil, or other suitable hydraulic fluid, under relatively low pressure to the interstitial spaces 30a and 30b respectively, between the outer surface 25 of each pad, 13 and 17, and the casing 18.

FIG. 2, illustrates on a somewhat larger scale the details of preloading one of the lesser loaded pads. Identical components common to both FIGS. 1 and 2 are given common designation in the Figures. For example, in FIGS. 1 and 2, lubricating oil is supplied under relatively low pressure (e.g., 25 psig) through a pipe 32a or other suitable conduit sealingly affixed, as by threading, to an opening 34a in casing 18. A clearance hole 36a allows the pipe 32a to pass through the top shell 20. Lubricating oil, following the arrowed path of FIG. 2, passes from pipe 32a through an axial orifice 38a through anti-rotation pin 40a which is fixed to casing 18 by threads 42a. Oil discharged from the orifice 38a passes into a chamber 44a in the outer side of pad 17 and then through the annular space between 40a and hardened bushing 46a to feed the narrow interstice 30a between the outer surface of pad 17 and the casing 18. The interstice 30a is exaggerated in size in the Figures for illustration purposes. Oil escaping from the interstice 30a passes inward toward the journal 10 and from there is returned to the bearing lubrication system. Identical means for supplying oil as described for preloading pad 17 are provided for pad 13 and therefore need not be discussed in detail. It will be recognized too, that tilting pad 12 may also be preloaded in like manner if desired.

The oil pressure thus supplied to the interstitial spaces 30a and 30b thus lightly preloads pads 13 and 17 against journal 10 while the lower pads 14, 15, and 16 retain their hard support of the journal 10. During operation, vibratory forces tend to displace the journal 10 against pads 13 and 17; however, the journal is restrained from responding since the oil (hydraulic fluid) in the interstitial space 30a and 30b is substantially incompressible and cannot rapidly be reduced in volume due to the inability of the oil to be rapidly squeezed from spaces 30a and 30b. In operational effect, the interstitial spaces 30a and 30b function as flow restriction means to prevent the rapid escape of oil and to restrain the journal 10.

Figure 3:
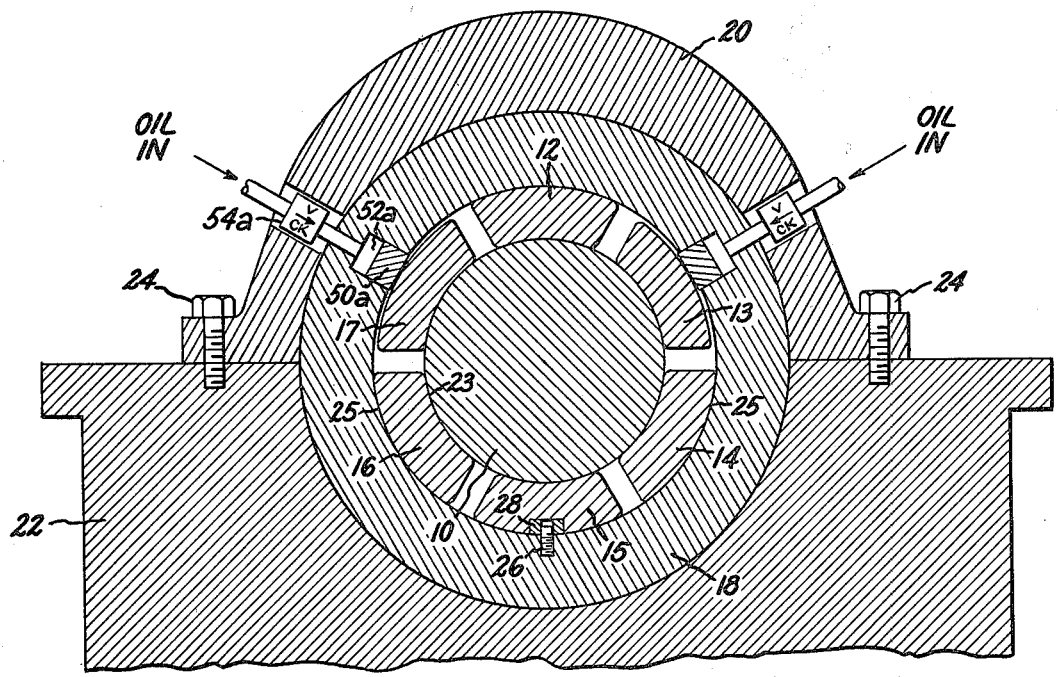
FIG. 3 is a transverse sectional view of an alternate embodiment of a journal bearing incorporating the invention.

FIG. 3 is another embodiment of the invention, operating on the same principle as that of the preferred embodiment discussed above: namely, that the upper pads 12, 13, and 17 are normally lightly preloaded but are able to assume a much firmer loading as journal 10 attempts to move. Again, the damping is accomplished by preventing the rapid escape of hydraulic fluid which is used to establish the preloading condition.

In FIG. 3 (wherein components identical to those of FIGS. 1 and 2 carry the same designations), pad 17 for example, is lightly preloaded by piston 50a which is lightly forced against the outer surface of pad 17 by lubricating oil pressure supplied to the cylinder 52a. The lubricating oil enters the cylinder 52a through check valve 54a which prevents the flow of oil in the reverse direction. A similar arrangement is provided for pad 13. As the journal 10 is urged to move by vibratory forces, the motion is damped by pads 17 and 13 and the hydraulic pressure in cylinders 52a and 52b. Some leakage of oil occurs from cylinders 52a and 52b around pistons 50a and 50b, respectively, to allow a slower release in the hydraulic pressure applied to the back side of each piston, 50a and 50b. This oil is returned to the bearing lubrication system.

Thus, while there has been shown and described what are considered preferred and alternate embodiments of the invention, it is understood that various other modifications may be made therein. For example, the flow restriction means included to prevent a rapid reduction in the volume of the hydraulic fluid used to maintain pad preloading may be provided external to the bearing structure without detracting from the inventive concept. It is intended to claim all such modifications which fall within the true spirit and scope of the present invention.

The invention claimed is:

1. A vibration-damping, tilting pad journal bearing comprising:
   a bearing casing including means for receiving hydraulic fluid under pressure;
   a plurality of tilting pads retained within the casing in an encompassing relationship to an associated journal, at least one of said pads being positioned to carry a lesser load from the journaal than the other pads of said plurality of pads, said one pad having a radially outer surface adjacent said casing which is in substantial geometrical conformance with said casing to define an interstice between said outer surface and said casing;
   a hydraulic fluid receiving chamber being defined by an opening in said outer surface and by a hardened bushing mounted within said opening;
   an anti-rotation pin having one end affixed to the casing and the other end projecting into said bushing to prevent circumferential dislocation of said one pad, said other end further defining an annular space between said bushing and said pin, and said pin having an axial orifice therethrough which provides for fluid communication between said receiving means and said chamber; and
   said one pad being preloaded against said journal by hydraulic fluid supplied under pressure through said receiving means and said axial orifice to said chamber and the discharge of said fluid from said chamber through said annular space into said interstice, and said interstice limiting a rapid outflow of hydraulic fluid therefrom to prevent rapid movement of said one pad such that said journal is substantially restrained from vibrating.

2. The journal bearing of claim 1 wherein said journal is mounted with its longitudinal axis substantially horizontal and said plurality of tilting pads includes a lower group of pads loaded by the weight of the journal and an upper group of pads which do not bear weight from the journal, and said one pad is included in said upper group of pads.

3. The journal bearing of claim 2 wherein said hydraulic fluid under pressure is a lubricating oil providing lubrication to such journal bearing.

* * * * *